US009997319B2

(12) United States Patent
Agliata et al.

(10) Patent No.: US 9,997,319 B2
(45) Date of Patent: Jun. 12, 2018

(54) POLE RESET TRUNNION

(71) Applicant: Hubbell Incorporated, Shelton, CT (US)

(72) Inventors: Peter M. Agliata, Birmingham, AL (US); Sterlin O. Cochran, Pell City, AL (US)

(73) Assignee: Hubbell Incorporated, Shelton, CT (US)

( * ) Notice: Subject to any disclaimer, the term of this patent is extended or adjusted under 35 U.S.C. 154(b) by 180 days.

(21) Appl. No.: 14/963,964

(22) Filed: Dec. 9, 2015

(65) Prior Publication Data

US 2016/0181042 A1    Jun. 23, 2016

Related U.S. Application Data

(60) Provisional application No. 62/096,094, filed on Dec. 23, 2014.

(51) Int. Cl.
  *H01H 33/00* (2006.01)
  *H01H 71/02* (2006.01)
  *F16C 11/02* (2006.01)

(52) U.S. Cl.
  CPC ......... *H01H 71/0207* (2013.01); *F16C 11/02* (2013.01); *F16C 2380/00* (2013.01)

(58) Field of Classification Search
  CPC ... H01H 71/0207; F16C 11/02; F16C 2380/00
  See application file for complete search history.

(56) References Cited

U.S. PATENT DOCUMENTS

| | | | |
|---|---|---|---|
| 2,558,957 A | 7/1951 | Hubbard et al. | |
| 3,321,721 A | 5/1967 | Smith | |
| 3,447,114 A | 5/1969 | Frink et al. | |
| 3,510,611 A | 5/1970 | Bridges | |
| 4,795,996 A * | 1/1989 | Brown | H01H 31/127 335/32 |
| 5,612,661 A | 3/1997 | Twenter et al. | |
| 5,854,582 A | 12/1998 | Clark et al. | |
| 2015/0116878 A1 * | 4/2015 | Richard | H01H 1/0015 361/71 |

OTHER PUBLICATIONS

PCT/US2015/066378 International Search Report and Written Opinion dated Apr. 25, 2016.

* cited by examiner

*Primary Examiner* — Anthony R. Jimenez
(74) *Attorney, Agent, or Firm* — Michael Best & Friedrich, LLP

(57) ABSTRACT

A resettable cutout sectionalizer uses a modified trunnion member including a bridge and a modified cutout hinge including at least one blocking flange. One actuated, the spring-loaded sectionalizer latching pin actuates to free the sectionalizer which is rotated open by the rotation of the trunnion. The trunnion rotates open and then is blocked from further rotation in a first direction by the bridge contacting the blocking flange(s) of the cutout hinge. To reset the device, the sectionalizer body is rotated against the blocking flange which causes the latching flange of the trunnion to cam against the latching pin to overcome the spring bias and push it back into the reset position.

17 Claims, 22 Drawing Sheets

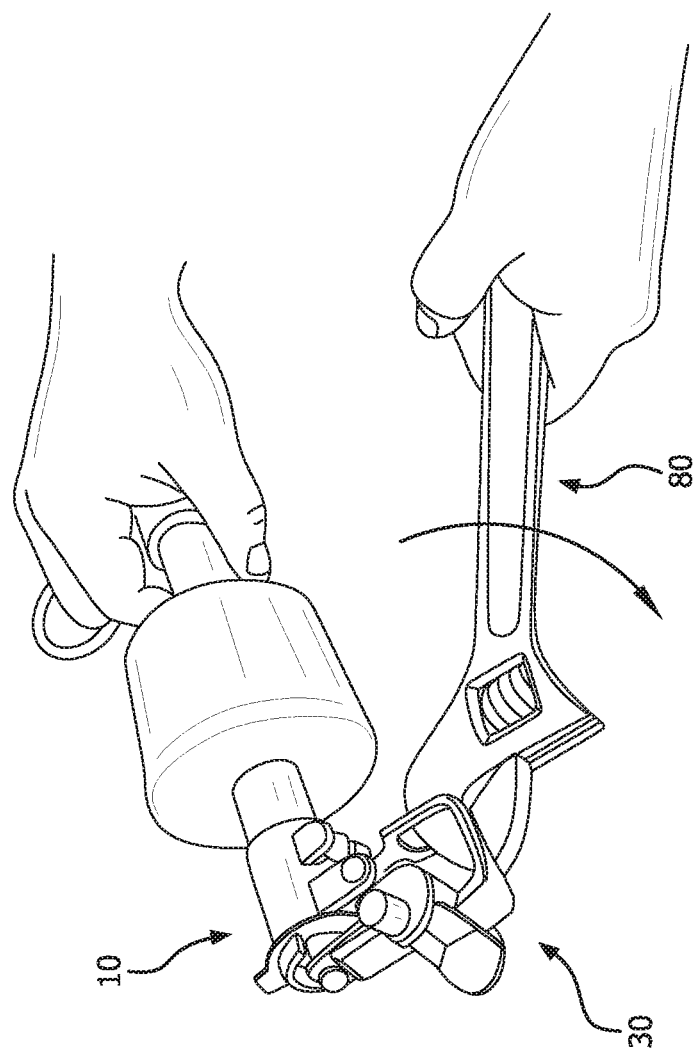

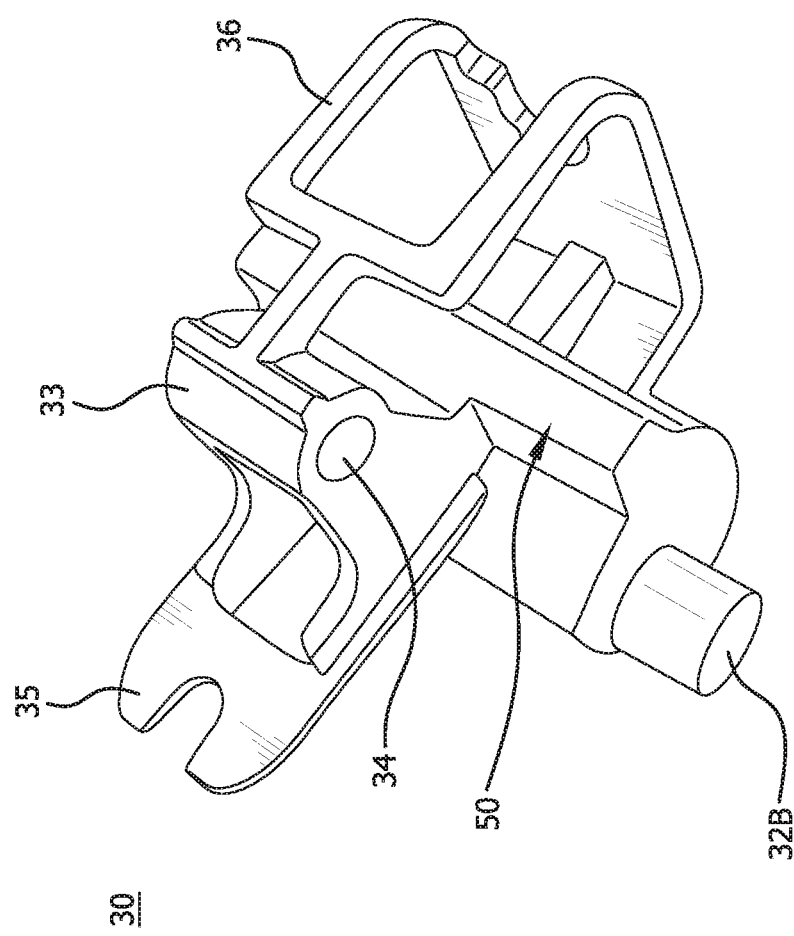

POLE RESET TRUNNION

CROSS REFERENCE TO RELATED APPLICATION

The present application claims the benefit of priority under 35 U.S.C. § 119(e) to U.S. Provisional No. 62/096,094 filed Dec. 23, 2014, the entire contents of which are hereby incorporated by reference.

FIELD OF THE INVENTION

The present invention relates generally to resettable sectionalizers. More particularly, the present invention relates to resettable sectionalizers deployed in cutout bodies that can be reset without removing them from the cutout. Still more particularly, the present invention relates to resettable sectionalizers using modified trunnion members to facilitate resetting without the need to remove the sectionalizer from the cutout.

BACKGROUND OF THE INVENTION

Sectionalizers are known in the art of power systems. A sectionalizer is a protective device that automatically isolates a faulted section of line from the rest of the distribution system. A present-day distribution system typically consists of a feeder line originating from a substation. Several lateral lines are tapped off of the feeder. Distribution transformers installed on these lateral lines supply end users. Often, several branch lines are tapped off of a lateral line, which, in turn, supplies power to several end users.

The challenge in the art of electrical distribution systems is to keep outages caused by overcurrents confined to a minimum possible section of the overall distribution system. In the art, the usual practice is to install progressively smaller protective devices, such as fuse cutouts, as the circuit moves away from the substation. However, the art has grown to appreciate that the overwhelming majority of faults on a system are temporary in nature lasting a few cycles to a few seconds. These temporary faults may trigger a fuse cutout to actuate, thereby disabling power to the downstream users on that branch line. Once a fuse cutout actuates, a repair truck must be dispatched to the scene to re-deploy the cutout in order for power to be restored. Given the prevalence of temporary faults, the art developed reclosers.

Automatic circuit reclosers contain circuitry that allows them to differentiate between temporary and permanent faults. The device clears temporary faults and coordinates downstream protective devices to isolate lines with permanent faults. To facilitate this operation, the recloser may work with sectionalizers deployed in cutout bodies. Sectionalizers "count" the number of operations of the recloser that feeds the circuit and opens to break the circuit if a predetermined number of counts is met, indicating the likely presence of a permanent fault. Sectionalizers thus help avoid the vast majority of electrical outages that would otherwise be experienced if simple fuse cutouts were deployed.

Similar to fuse cutouts, when the sectionalizer actuates, gravity allows it to fall out of engagement and hang from the bottom hinge of the cutout body. This fall is accomplished by the provision of a trunnion positioned in the cutout's bottom hinge. The trunnion is held against its natural bias when the device is in the closed position (occasioned by the sectionalizer being fixed into the cutout). When the sectionalizer releases from the cutout, the trunnion rotates away from the cutout and carries the sectionalizer downwardly to the open position. Thus, on those rare occasions of permanent faults, the sectionalizer will release itself from the cutout hood and hang freely in a manner similar to a fuse tube in a fuse cutout. Also, similarly to the fuse cutout, a worker must be dispatched to the scene to re-deploy the sectionalizer in the cutout body in order for power to be restored downstream in the line.

In re-deploying the sectionalizer, the firing mechanism of the sectionalizer must be reset so the sectionalizer will operate properly upon the occurrence of the next permanent fault condition. Resetting is accomplished by pushing the spring-loaded bottom pin back into the "ready" or "set" position. In order to perform the resetting operation, the sectionalizer and trunnion must be removed from the cutout body by a lineman who then uses a wrench to hold the trunnion while rotating the sectionalizer body in a manner that forces the pin back into the set position. The re-loaded sectionalizer and trunnion combination is then re-inserted into the cutout body and power restored to the branch.

While the ability to reduce up to 95% of power outages through reclosers and sectionalizers is a great advance in the art. The present inventors recognized a need in the art to be able to re-deploy sectionalizers without having to remove them from the cutout and physically manipulate them with one's hands and a wrench.

As recognized by the present inventors, the foregoing highlights some of the problems with conventional sectionalizers housed in cutout bodies. Furthermore, the foregoing highlights the present inventors' recognition of a long-felt, yet unresolved need in the art for a resettable sectionalizer configured for use in a cutout that can be reset without having to remove the sectionalizer from the cutout. In addition, the foregoing highlights the inventors' recognition of a need in the art for a resettable sectionalizer that can be reset without a user having to hold the assembly and manipulate its parts with tools.

SUMMARY OF THE INVENTION

Various embodiments of the present invention overcome various of the aforementioned and other disadvantages associated with prior art sectionalizers and methods of resetting sectionalizers, and offer new advantages as well.

According to one aspect of various embodiments of the present invention, there is provided a resettable sectionalizer for mounting in a cutout body adapted to be reset without the need to remove the sectionalizer from the cutout body.

According to another aspect of various embodiments of the present invention, there is provided a resettable sectionalizer for mounting in a cutout body adapted to be reset without the need for disassembly.

According to another aspect of various embodiments of the present invention, there is provided a resettable sectionalizer for mounting in a cutout body adapted to be reset without the need for tools (other than a hook stick).

According to yet another aspect of various embodiments of the present invention, there is provided a resettable sectionalizer for mounting in a cutout body adapted to be reset without the need for removal of any components from the pole.

According to one advantageous feature of various embodiments of the present invention, the sectionalizer assembly comprises a modified trunnion member that facilitates resetting of the sectionalizer.

According to another advantageous feature of various embodiments of the present invention, the sectionalizer assembly comprises a modified trunnion member configured to allow rotation of the sectionalizer body to push in the locking pin to reset the sectionalizer.

In accordance with one advantageous feature of a preferred embodiment of the invention, the trunnion member includes a projection configured to prevent movement of the trunnion in at least one direction such that rotation of the sectionalizer body results in a force that pushes the locking pin into the reset position.

In accordance with another advantageous feature of a preferred embodiment of the invention, the cutout hinge member includes a portion for engaging, and preventing further rotation of, the trunnion in at least one direction such that rotation of the sectionalizer body results in a force that pushes the locking pin into the reset position.

In various advantages embodiments of the invention, the trunnion member includes a bridge projection adapted to engage flange(s) on the hinge such that rotation of the trunnion is prevented by the mating of the bridge against the flange(s).

In a preferred embodiment, the bridge comprises a solid, upwardly extending metal protrusion of a thickness suitable for accepting the forces necessary to carry out the resetting of the sectionalizer. Similarly, the flange(s) preferably comprise the inwardly extending "ears" in the bottom mouth section of prior art hinges that are sized for accepting the forces necessary to carry out the resetting of the sectionalizer without bending, breaking, or otherwise deforming.

In accordance with a presently preferred embodiment, after the sectionalizer body activates and drops out of the cutout body, the bridge of the trunnion engages the ears of the hinge member to prevent further rotation in the downward direction. The sectionalizer body may then be pulled in the downward direction resulting in the connection pin being cammed against the trunnion, overcoming the spring bias, and sliding back into the set position.

In accordance with this presently preferred embodiment, after the connection pin is pushed into the set position from rotation in the downward direction, the sectionalizer body can be rotated back in the upward direction until it is operably re-deployed in the cutout body and ready for the next permanent fault condition.

The invention as described and claimed herein should become evident to a person of ordinary skill in the art given the following enabling description and drawings. The aspects and features of the invention believed to be novel and other elements characteristic of the invention are set forth with particularity in the appended claims. The drawings are for illustration purposes only and are not drawn to scale unless otherwise indicated. The drawings are not intended to limit the scope of the invention. The following enabling disclosure is directed to one of ordinary skill in the art and presupposes that those aspects of the invention within the ability of the ordinarily skilled artisan are understood and appreciated.

As used in this application, the terms "front," "rear," "upper," "lower," "upwardly," "downwardly," and other orientational descriptors are intended to facilitate the description of the exemplary embodiment of the present invention, and are not intended to limit the structure of the exemplary embodiment of the present invention to any particular position or orientation.

BRIEF DESCRIPTION OF THE DRAWINGS

Various aspects and advantageous features of embodiments of the present invention will become more apparent to those of ordinary skill when described in the detailed description of a preferred embodiment and reference to the accompany drawing wherein:

FIGS. 3A-C depicts the major steps in the resetting process for prior art resettable sectionalizers in a cutout body.

FIG. 4 is a top left perspective view of an embodiment of a trunnion member for use in embodiments of the present invention.

Throughout the drawings, like reference numerals will be understood to refer to like parts, components and structures.

DETAILED DESCRIPTION

While the present invention will be described in connection with embodiments suited for the operation of a sectionalizer in a cutout body, it will be readily apparent to one of ordinary skill in the art armed with the present specification that the present invention can be modified and applied to any suitable device or the like in any suitable environment.

Figure 1:
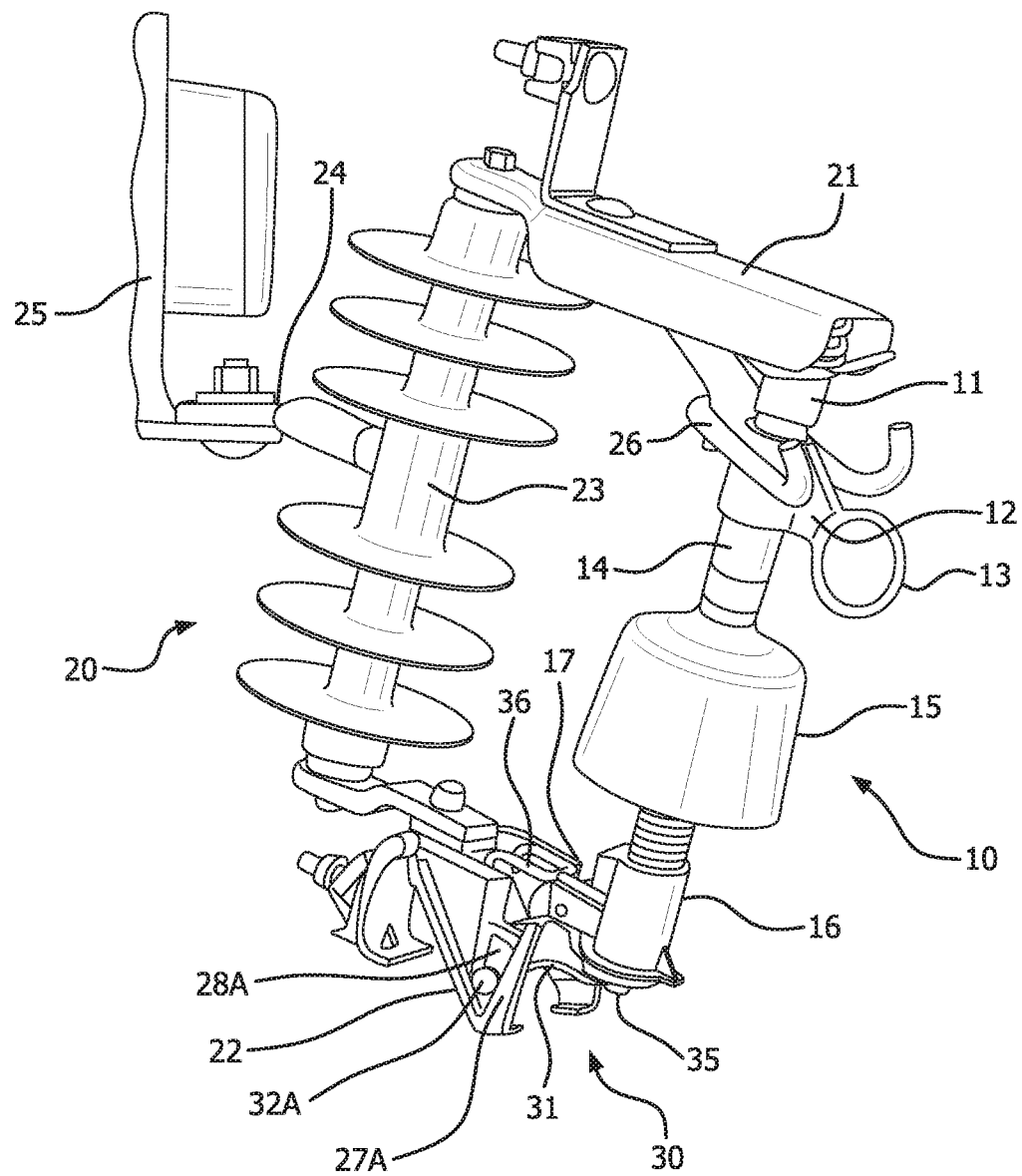
FIG. 1 is a perspective view of a prior art resettable sectionalizer in a cutout body.
Figure 2:
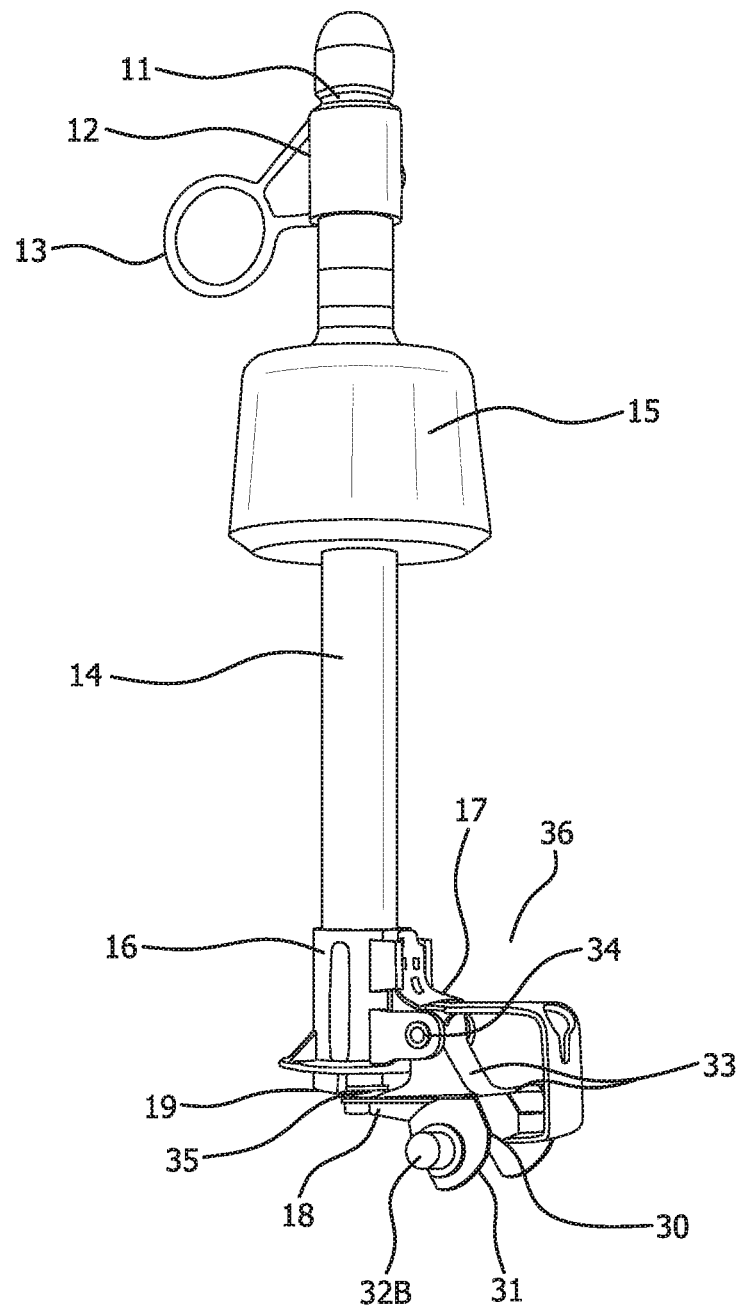
FIG. 2 is a perspective view of a prior art sectionalizer and trunnion assembly of a resettable sectionalizer for a cutout body.

For context, a prior art cutout sectionalizer assembly 100 is depicted in FIGS. 1-3. As shown in FIG. 1, a conventional cutout sectionalizer assembly 100 includes a sectionalizer 10 rotatably mounted in the frame of a cutout body 20 by a trunnion 30 member. As best shown in FIG. 2, from top to bottom, the sectionalizer 10 comprises a silver plated top contact 11 above an upper tube casing 12. The tube casing 12 includes a hook stick ring 13 used by lineman to open and close the sectionalizer assembly 100. Centrally disposed around the tube body 14 of the sectionalizer 10 is the bulbous electronics housing 15. The electronics responsible for interfacing with the recloser and discriminating between transient and permanent faults are contained in the housing 15. Disposed on the bottom of the tube body 14 is a lower tube casting 16 and the lower electrical contact 17. At the very bottom of the sectionalizer 10 (and extending through the sectionalizer body) is the locking pin 18. The locking pin 18 includes a neck portion 19 that is instrumental in the actuation and resetting of the sectionalizer 10. As will be appreciated by one of ordinary skill in the art, the firing and resetting of the pin 18 are what allow the sectionalizer to open to isolate a branch line in permanent fault conditions as well as be reset and re-deployed for repeated use.

Returning to FIG. 1, the sectionalizer 10 is deployed in a standard cutout body 20. As will be appreciated by one of ordinary skill in the art, the cutout body 20 comprises three main sections: a top hood 21, a bottom hinge 22, and an insulator body 23 disposed therebetween. The insulator body 23 typically includes a bracket 24 for mounting the assembly 20 to a utility pole 25.

The top hood 21 includes the top electrical contact that mates with the top contact 11 of the sectionalizer 10. The top hood 21 also includes a tube holder bracket 26 for receiving and holding the sectionalizer 10 in the proper position during operation.

The bottom hinge 22 includes the bottom contact that mates with the lower contact 17 of the sectionalizer 10. In addition, the hinge 22 is generally configured to include a pair of jaw members with upwardly extending teeth 27A, 27B defining pin openings 28A, 28B for receiving the pins of a trunnion 30. The hinge 22 also includes inwardly disposed flange "ears" 60A, 60B.

Typical prior art trunnions 30 include a main oblong body section 31 having laterally extending pins 32A, 32B. The body section 31 is configured, and the pins 32A, 32B positioned, such that the trunnion 30 will rotate downwardly when released. The trunnion 30 includes a central hub portion 33 that defines a pin shaft 34 for receiving a connection pin to connect the trunnion 30 to the bottom casting 16 of the sectionalizer 10. The trunnion 30 includes a forked mounting flange 35 that is sized and positioned to surround the neck 19 of the locking pin 18. The locking pin 18 is thus able to push against the flange 35 when fired in response to a fault condition. The trunnion 30 also includes a hook stick ring 36 and lower contact area 47.

In operation, the trunnion 30 is attached to the sectionalizer 10 and rotates when the locking pin 18 fires and releases the sectionalizer 10 from its locked position in the cutout body 20. The force of the locking pin 18 firing pushes the trunnion 30 downwardly, thereby starting the rotation. Once freed from the locked position, gravity allows the trunnion 30 to continue its rotation, whereby the sectionalizer 10 is pulled downwardly until it hangs freely in the open position.

Figure 3A:
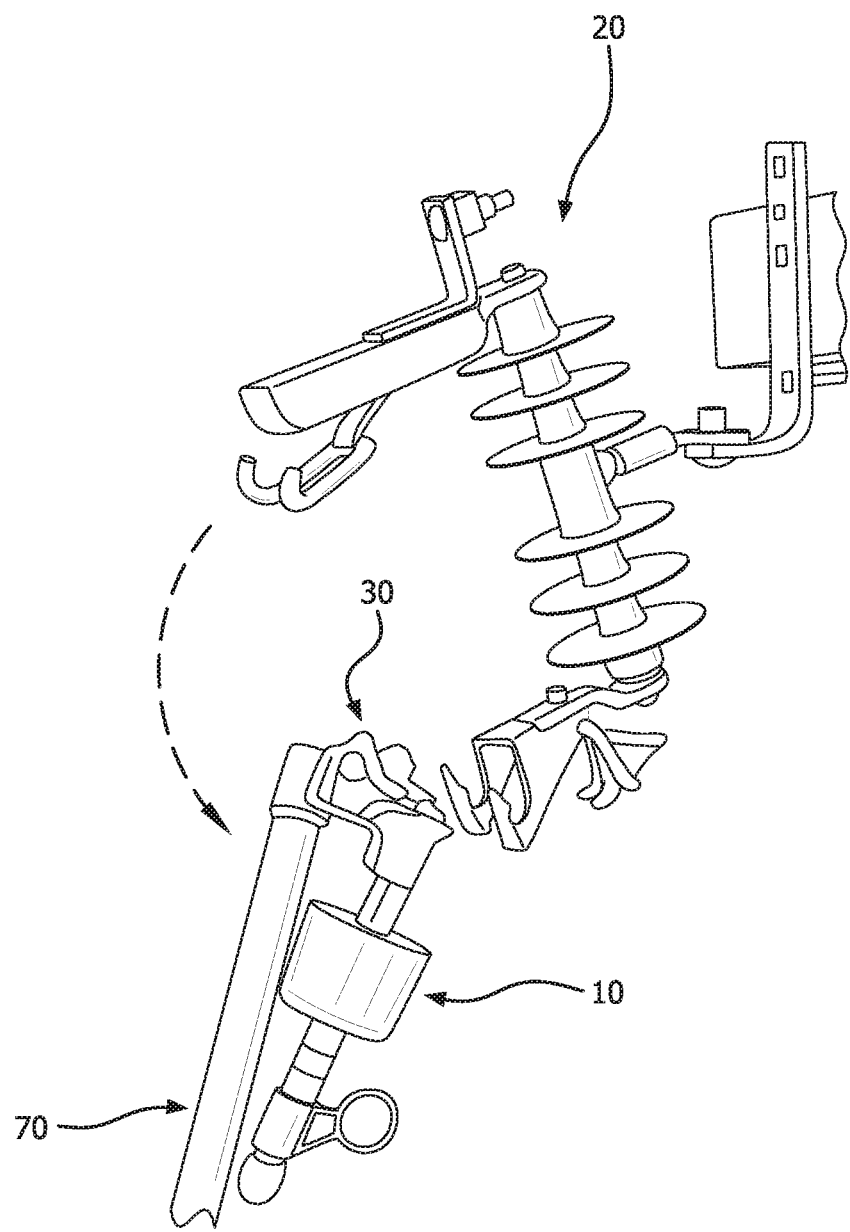

Once the sectionalizer 10 opens and falls in a fault condition, the sectionalizer 10 dangles until reset. As shown in FIG. 3A, the first step in the resetting process is that a lineman uses a hook stick 70 to remove the sectionalizer-trunnion sub-assembly from the hinge 22 of the cutout 20.

The next step in the resetting process, as shown in FIG. 3B, is that the lineman holds the sectionalizer 10 stationary in one hand and uses a wrench 60 with the other hand to crank the trunnion 30 towards the tube body 14 so the mounting fork flange 35 can push against the pin 18 with enough force to overcome the outward spring bias of the pin 18 and return it to the set position.

Figure 3C:
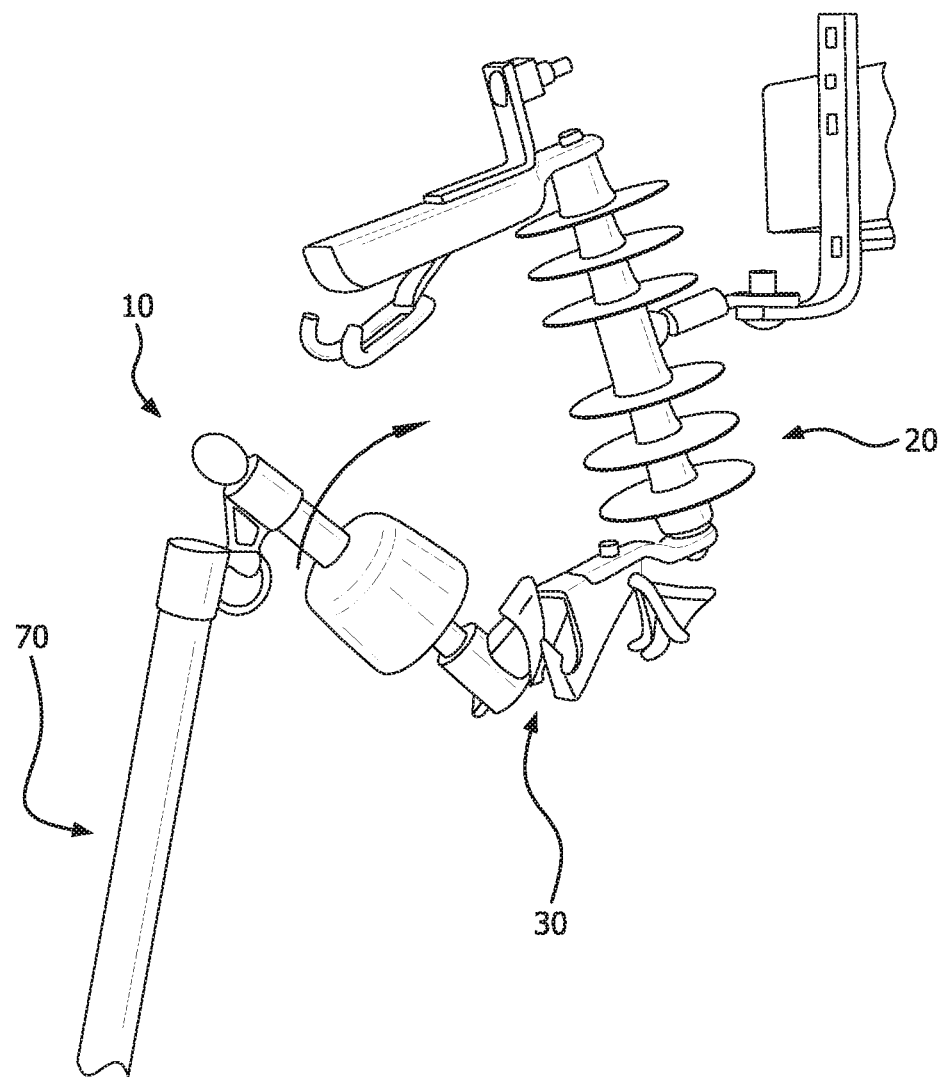
Figure 5:
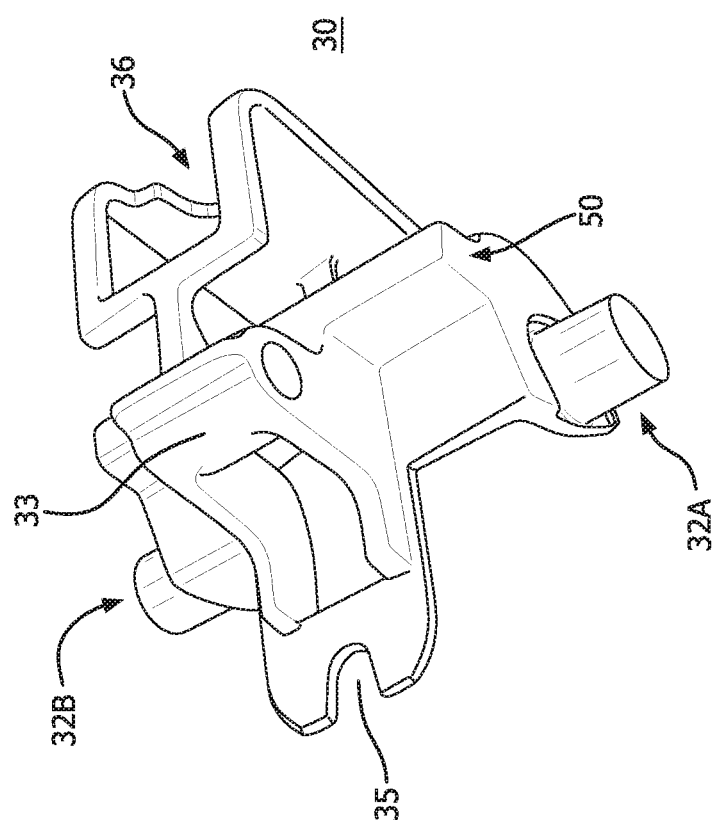
FIG. 5 is top left perspective perspective view of an embodiment of a trunnion member for use in embodiments of the present invention.
Figure 6:
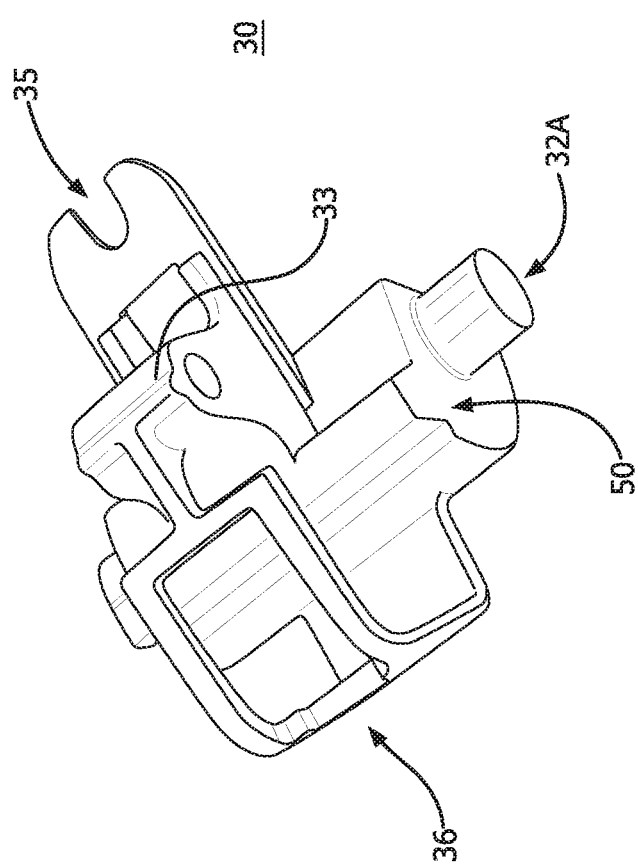
FIG. 6 is top right perspective perspective view of an embodiment of a trunnion member for use in embodiments of the present invention.
Figure 7:
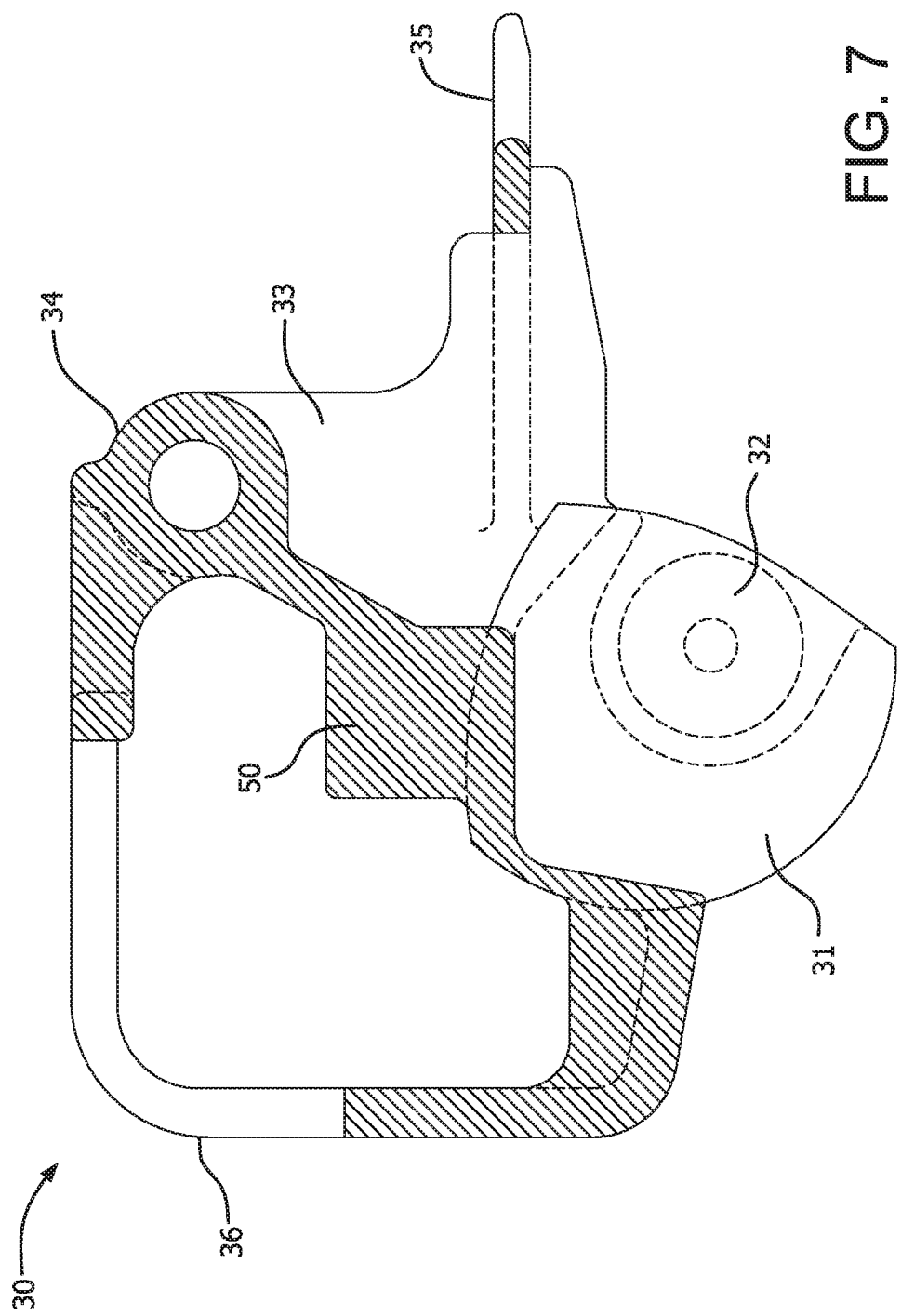
FIG. 7 is a cross-sectional view of an embodiment of a trunnion member for use in embodiments of the present invention.
Figure 8:
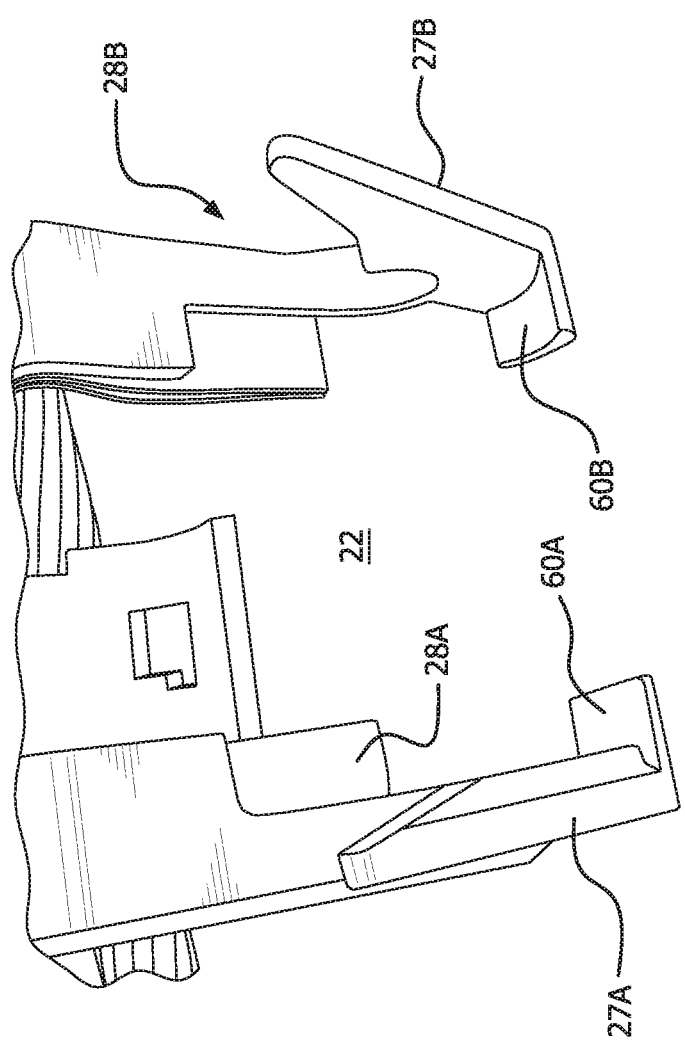
FIG. 8 is a front sectional view of the jaws of a hinge member having flange ears for use in embodiments of the present invention.
Figure 9:
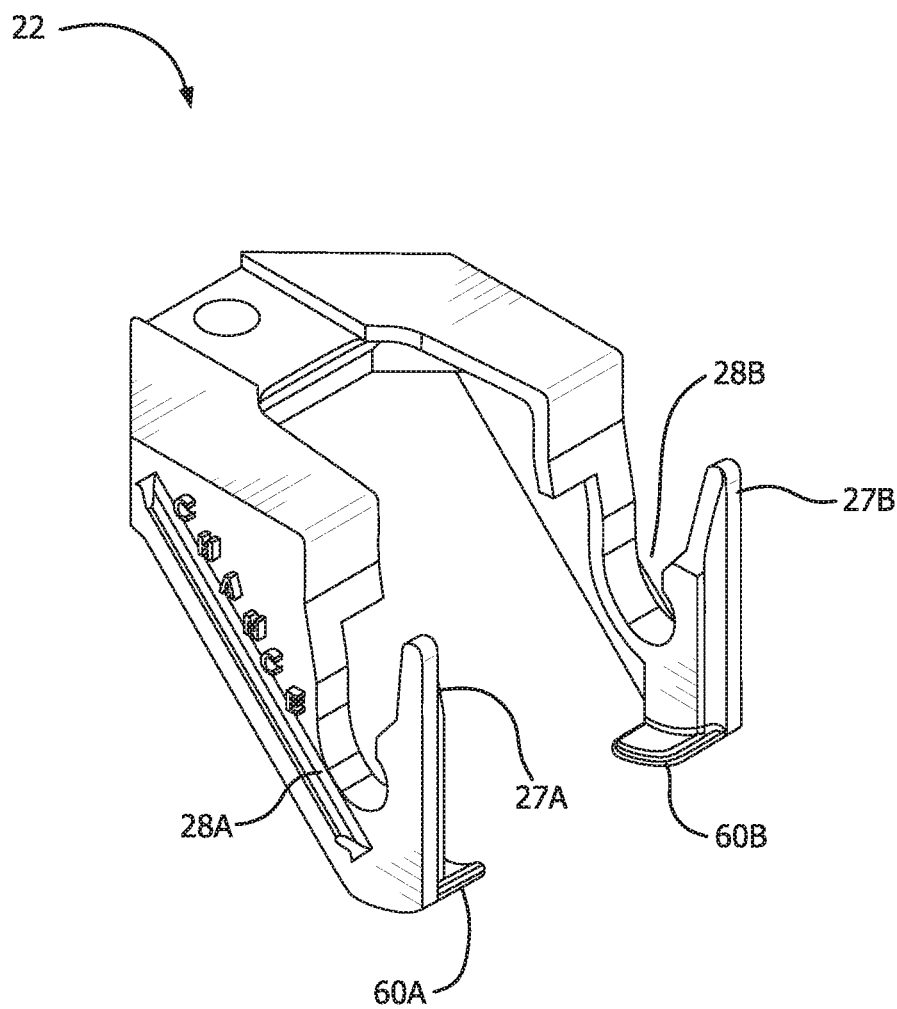
FIG. 9 bottom right perspective view of a hinge member for use in embodiments of the present invention.
Figure 10:
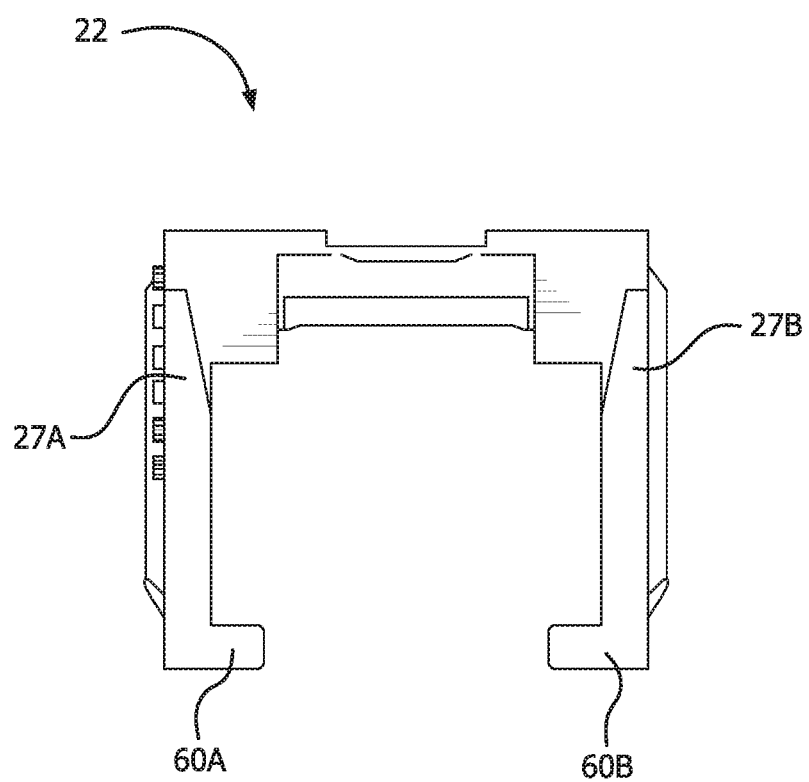
FIG. 10 is front view of a hinge member for use in embodiments of the present invention.
Figure 11:
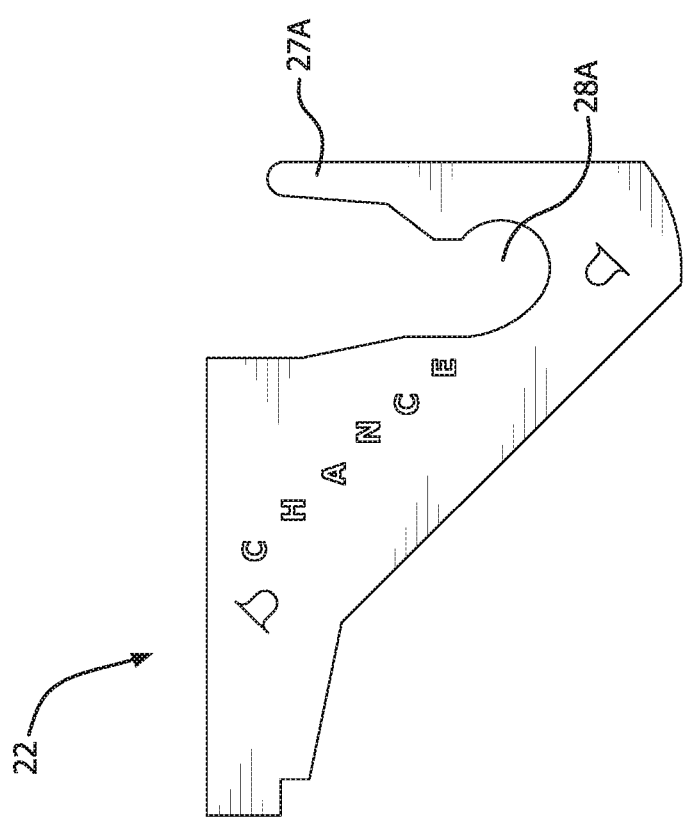
FIG. 11 is a side view of a hinge member for use in embodiments of the present invention.
Figure 12:
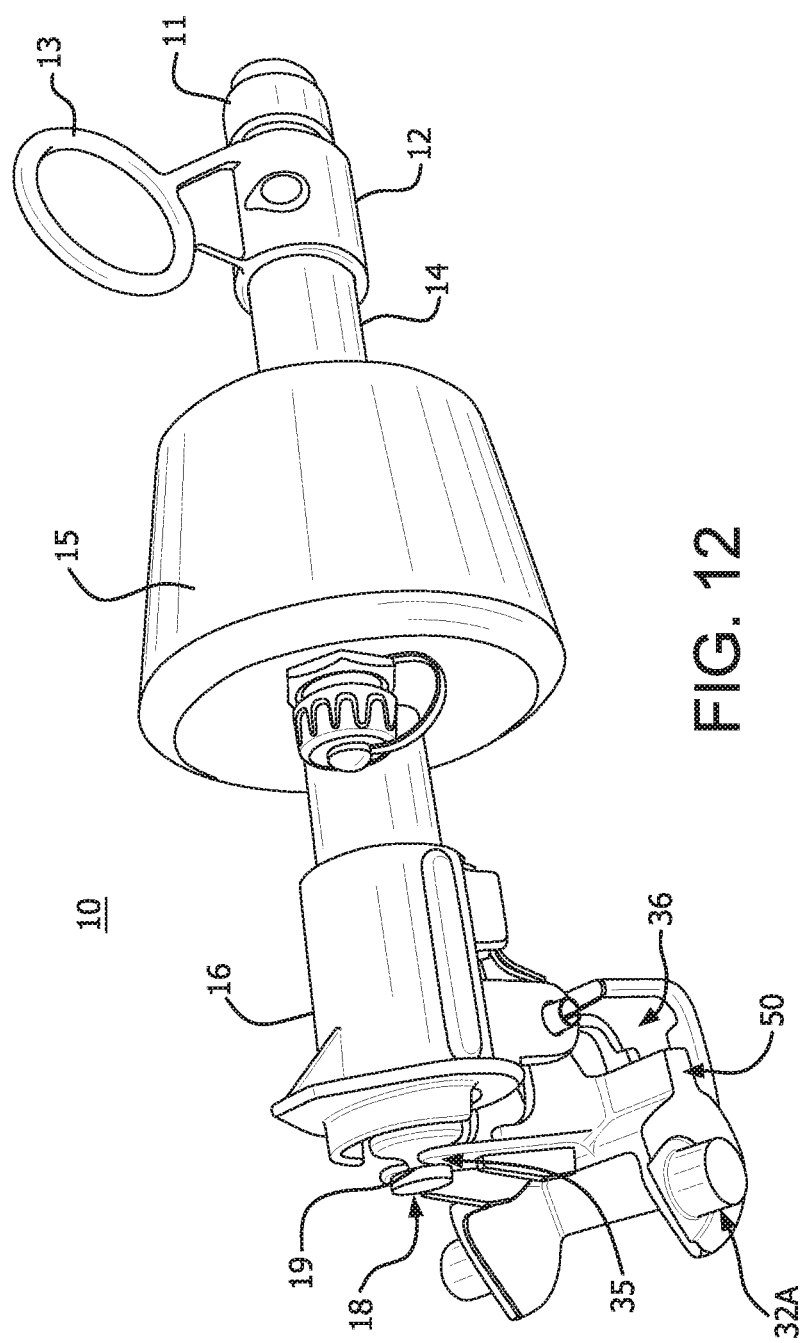
FIG. 12 is a perspective view of a trunnion and sectionalizer sub-assembly when the locking pin is in the set position according to a preferred embodiment of the invention.
Figure 13:
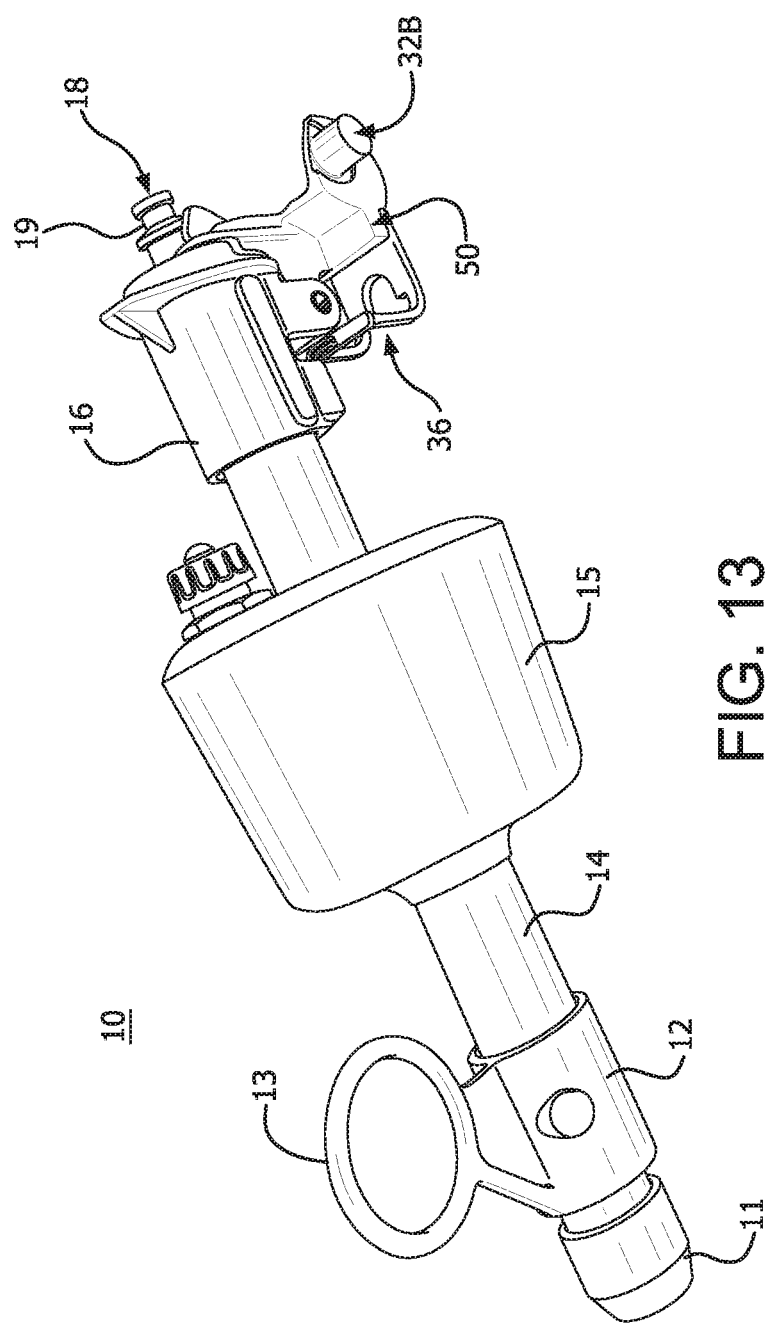
FIG. 13 is a perspective view of trunnion and sectionalizer sub-assembly after the locking pin has been actuated.
Figure 14:
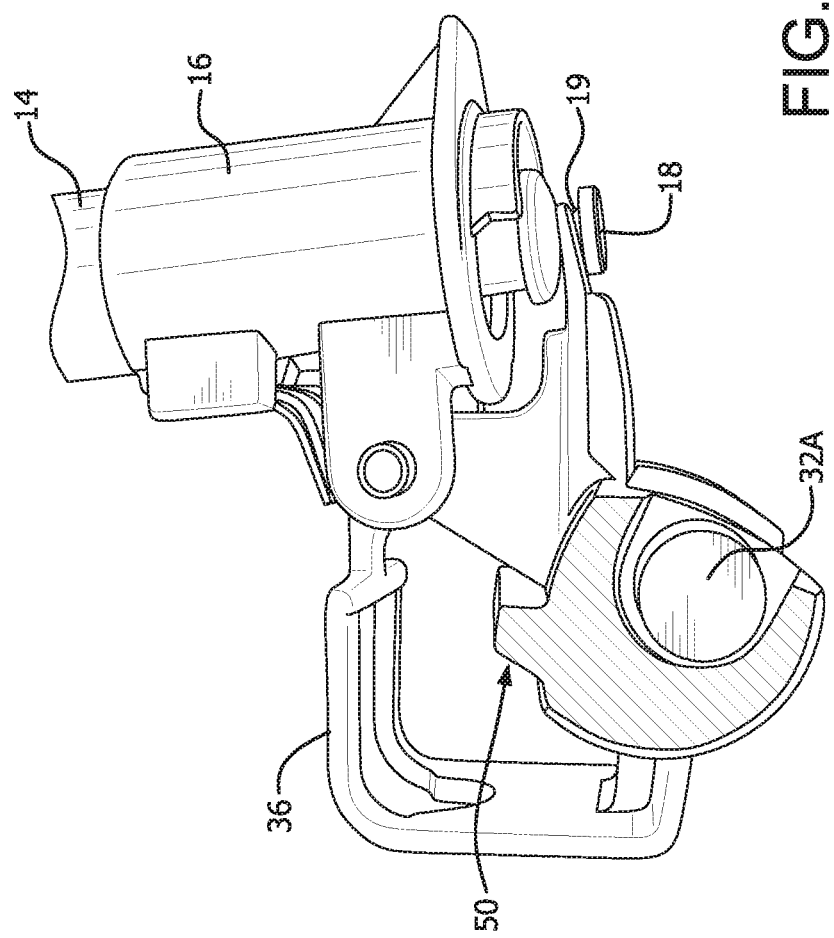
FIG. 14 is a side view of the bottom portion of a trunnion and sectionalizer sub-assembly with the locking pin in the set position according to a preferred embodiment of the invention.
Figure 15:
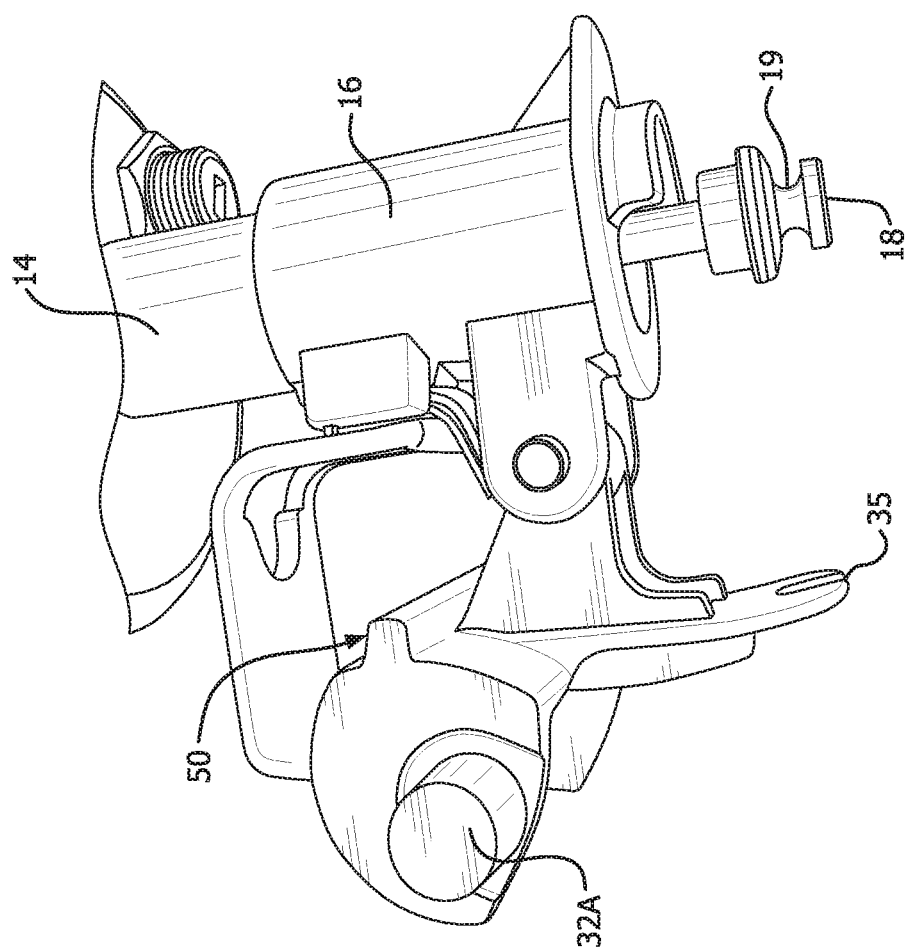
FIG. 15 is a side view of a trunnion and sectionalizer sub-assembly showing the locking pin in the actuated position.
Figure 16:
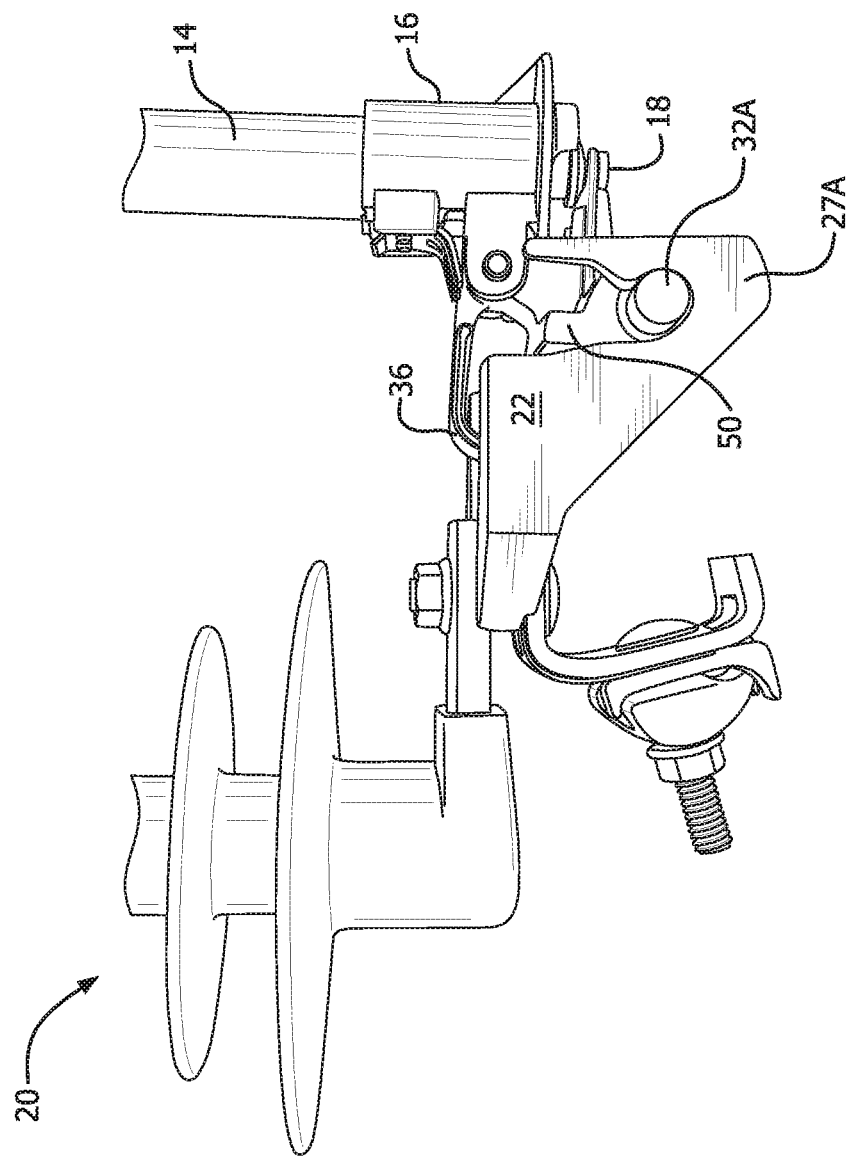
FIG. 16 shows the bottom portion of a resettable sectionalizer using an embodiment of the modified trunnion member of the present invention in the set position.

As shown in FIG. 3C, once the locking pin 18 is reset, the sectionalizer-trunnion sub-assembly is repositioned in the jaws of the hinge 22 and the lineman uses the hook stick ring 13 of the sectionalizer 10 to rotate the sectionalizer 10 back into the closed position in the cutout body 20 with the hookstick 70. Once returned to the closed position, power is restored in the branch and the sectionalizer 10 is operable to respond to any future fault conditions.

As will be appreciated by one of ordinary skill in the art, the sectionalizer-trunnion sub-assembly must be removed from the cutout body 20 because the trunnion 30 is free to rotate back and forth in the hinge pin openings 28A, 28B and thus there is no way to push the latching pin 18 back into place without removing the sub-assembly and physically cranking on the sub-assembly to push the pin back into the reset position. The present inventors recognized this major drawback with prior art sectionalizers. The inability to reset sectionalizers unless they were removed from the pole greatly increases the time, cost, and efficiency when using sectionalizers. To overcome these drawbacks, the present inventors conceived of an assembly that can be reset without the need for removing the sectionalizer.

In its simplest and broadest form, the assembly is configured to prevent rotation of the trunnion in at least one direction so that force can be used to force the latching pin back into the reset position. While any suitable configuration that achieves the resetting operation as described herein is deemed within the scope of the invention, a presently preferred embodiment is depicted in FIGS. 4-20.

As shown in the Figures, a presently preferred embodiment exemplifying aspects of the present invention makes use of a modified trunnion to engage the flange ears of a prior art hinge member (or another suitable surface of a modified hinge member if preferred). Specifically, as shown in FIGS. 4-7, a trunnion 30 member is provided that includes the features of prior art trunnions, but further includes a bridge 50. As depicted, the bridge 50 comprises an upwardly extending ridge. The ridge is integrally formed with the trunnion 30, which is preferably cast as a unitary piece. The bridge 50 is sized to provide the strength necessary for the resetting operation.

The bridge 50 also includes a profile that does not interfere with the normal operation of the trunnion 30 apart from the aspects of the resetting operation discussed herein.

As best shown in FIGS. 8-11, the hinge 22 includes the inwardly extending "ear" flanges 60A, 60B found on most prior art hinges. The ears 60A, 60B are commonly positioned at the bottom of the hinge with most prior art cutouts. These hinge ears 60A, 60B are sufficiently sized to withstand the forces that will be encountered with the resetting of the latching pin 18 as further described herein.

As shown in FIGS. 12-20, and as will now be appreciated by one of ordinary skill in the art armed with the present specification, the latching pin 18 fires to start the rotation of the trunnion 30. In order for the device to reset, the latching pin 18 must then be pushed back into its original position. Using a trunnion 30 equipped with a bridge 50 configured to engage the including inwardly extending ear flanges 60A, 60B of the hinge 22, the trunnion 30 can be prevented from rotating in the downward direction after the sectionalizer 10 opens.

Figure 17:
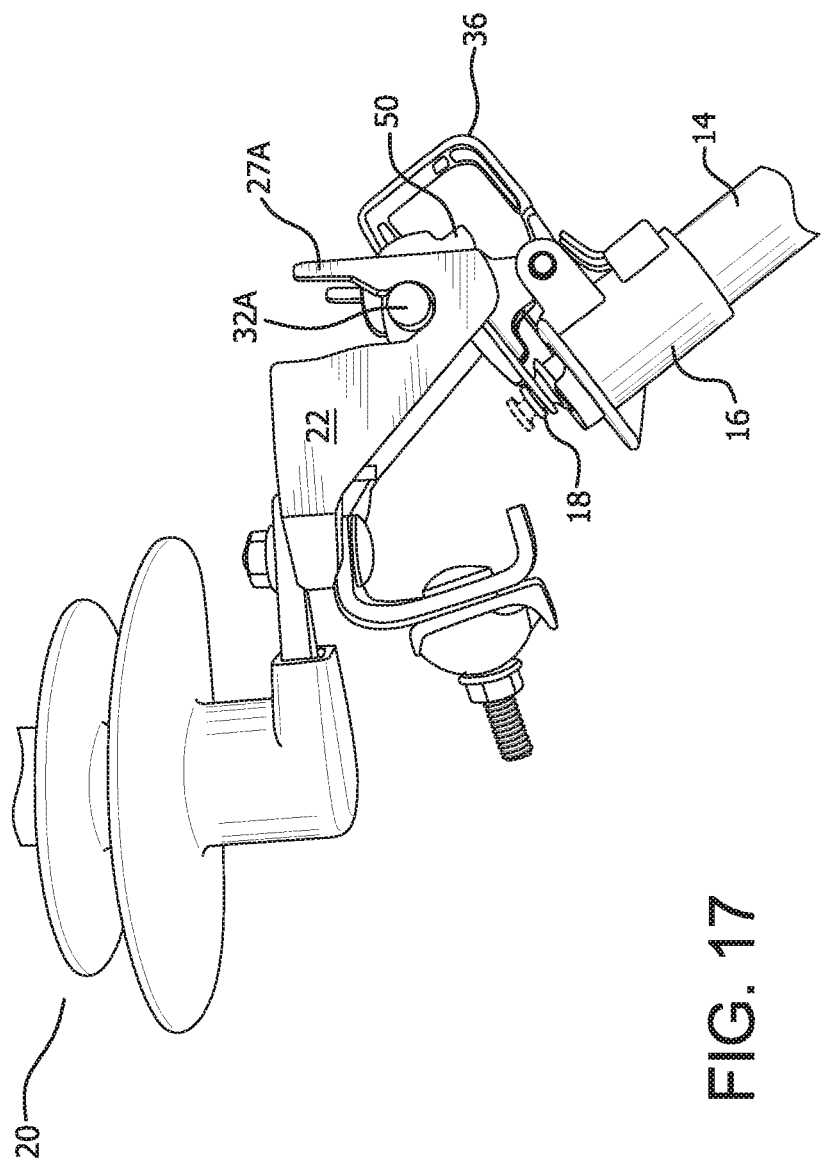
FIG. 17 shows the bottom portion of a resettable sectionalizer using an embodiment of the modified trunnion member of the present invention in the tripped position before resetting.
Figure 18:
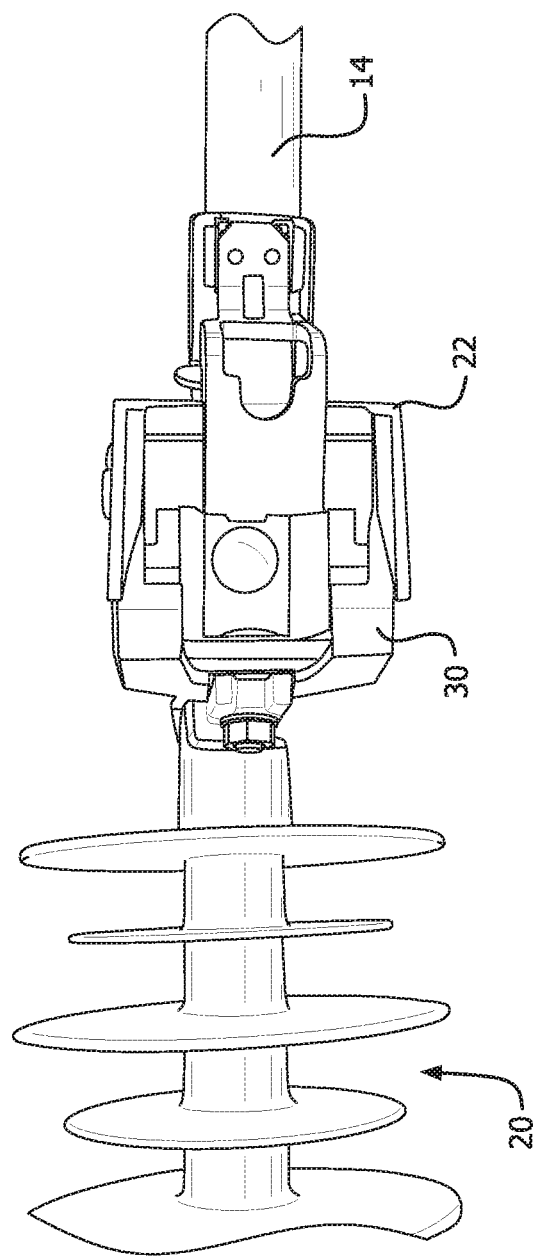
FIG. 18 is a front view of the bottom portion of a resettable sectionalizer using an embodiment of the modified trunnion member of the present invention in the tripped position before resetting.
Figure 19:
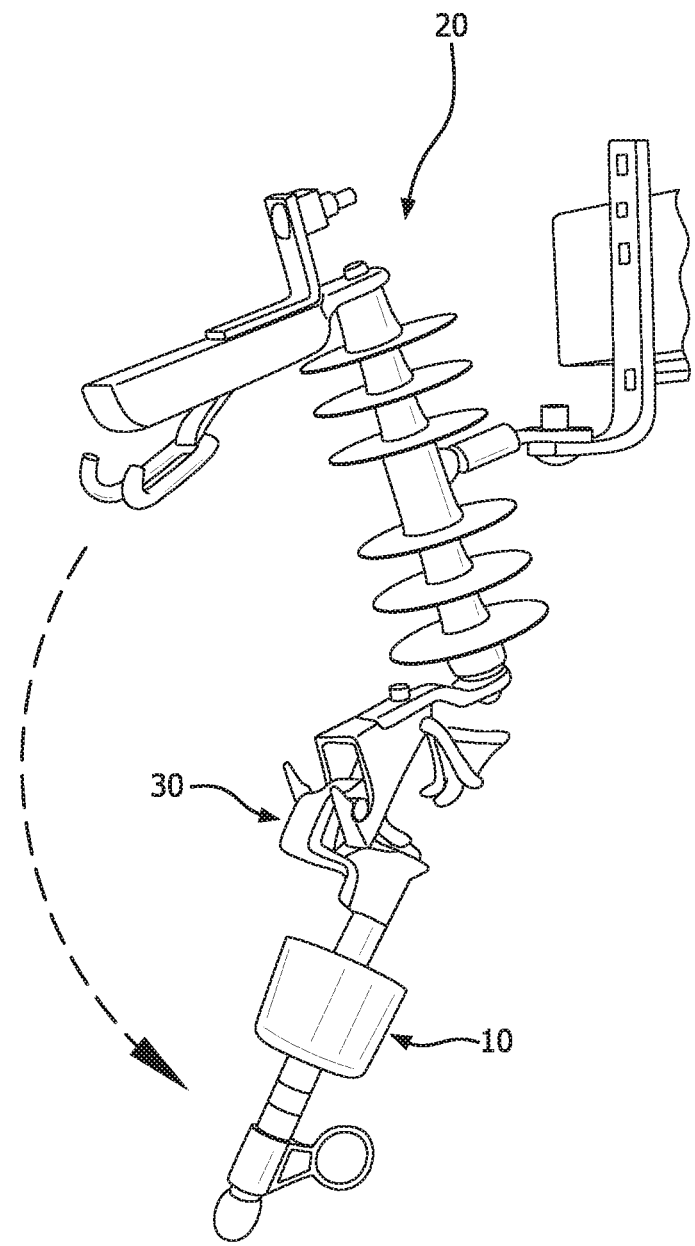
FIG. 19 is a perspective view of a resettable sectionalizer using an embodiment of the modified trunnion member of the present invention after actuation falling into the tripped position.
Figure 20:
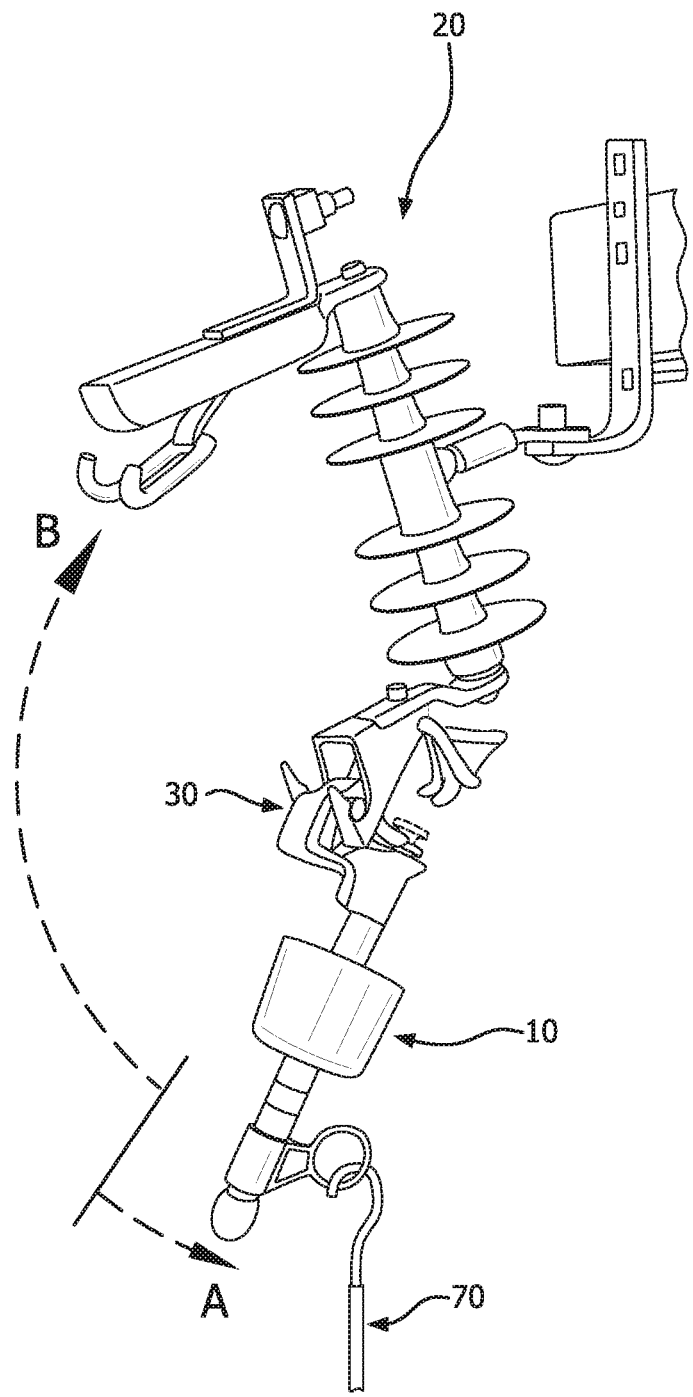
FIG. 20 is a perspective view showing the two step process of resetting an embodiment of the present invention using an embodiment of the modified trunnion member of the present invention.

Specifically, as shown in FIGS. 15-19, upon release, the trunnion 30 rotates downwardly until the bridge 50 runs into the ear flanges 60A, 60B. At that point, the solid metal pieces contact one another and the fixed ears 60A, 60B of the hinge 22 prevent further rotation of the trunnion 30. As shown in FIGS. 17-19, the rotation of the trunnion 30 is effectively "blocked" from further downward movement. However, as shown in FIG. 20, if force continues to be applied to the sectionalizer body 10 in the downward direction (shown as arrow "1"), the force causes the trunnion's fork flange 35 to cam against the latching pin 18 until the pin's bias is overcome and the pin moves back into the set position. Once the pin is reset, the sectionalizer 10 is ready to be rotated back into the closed position (shown as arrow "2"). As shown in FIG. 20, the resetting operation can be accomplished with a hook stick 70 being deployed in the hook stick ring 13 of the sectionalizer 10.

In operation, a lineworker encountering an actuated sectionalizer embodying a bridged trunnion in a prior art cutout, or other suitable configuration of pieces, will be able to insert a hook stick into the hook stick ring of the top casting, pull down on the tube body until the pin is pushed back to the set position, and then rotate the sectionalizer upwardly until it is back in the closed position. The resetting can be done in a fluid motion with a simple pulling down and then pushing up of the hook stick.

A presently preferred embodiment of a trunnion 30 having a bridge 50 is shown in the various views of figures. However, one of ordinary skill in the art armed with the present specification will readily appreciate that any suitable configuration of a trunnion that facilitates blocking of its rotation in a direction is deemed to be within the scope of the invention.

A presently preferred embodiment of a prior art hinge 22 having inwardly extending flanges 60A, 60B is shown in the various view of figures. Again, however, one or ordinary skill in the art will appreciate that any suitable configuration of a bottom hinge, or separate piece, that facilitates hindrance of the rotation of the trunnion in a direction is also deemed to be within the scope of the invention. For example, outwardly rather than inwardly disposed blocking flanges and modified bridge portions may be used.

While advantageous embodiments have been chosen to illustrate the invention, it will be understood by those skilled in the art that various changes and modifications may be made therein without departing from the scope of the invention. The above embodiments are for illustrative purposes and are not intended to limit the scope of the invention or the adaptation of the features described herein to particular tools. Those skilled in the art will also appreciate that various adaptations and modifications of the above-described preferred embodiments can be configured without departing from the scope and spirit of the invention. Therefore, it is to be understood that the invention may be practiced other than as specifically described.

What is claimed is:

1. A pole reset trunnion comprising:
   an oblong main body portion;
   a flange portion extending from said main body portion, the flange portion formed to receive a latching pin;
   a hub portion between said flange portion and said main body portion;
   a hook stick ring portion connected on a first end to said hub portion and connected on a second end to said main body portion; and
   a blocking bridge disposed on said main body portion, wherein the blocking bridge is utilized to reset the latching pin in the flange portion.

2. The pole reset trunnion of claim 1, wherein the flange portion is a forked flange portion for substantially surrounding a neck portion of the latching pin, and wherein the latching pin is reset when the forked flanged portion is engaged with the neck portion of the latching pin.

3. The pole reset trunnion of claim 1, wherein said blocking bridge comprises at least one raised rectangular shaped block.

4. The pole reset trunnion of claim 3, wherein the blocking bridge includes two rectangular shaped blocks.

5. The pole reset trunnion of claim 3, wherein said trunnion comprises metal.

6. The pole reset trunnion of claim 5, wherein said trunnion is cast as a unitary piece.

7. A resettable cutout sectionalizer comprising:
   a cutout body comprising a hood member and a hinge, wherein the hinge includes a pair of teeth members, the teeth members defining pin openings and including at least one blocking flange;
   a trunnion having a body portion including two laterally extending pins pivotably disposed in said pin openings of said hinge,
   wherein said trunnion includes at least one bridge portion formed along the body portion;
   a sectionalizer including an actuating mechanism, the sectionalizer disposed in said cutout body such that said sectionalizer is in contact with said hood member on a first end and said hinge on a second end when in a closed position,
   wherein the second end is in contact with said hinge via said trunnion, and
   whereby, actuation of said sectionalizer results in rotation of said trunnion until the at least one bridge portion of said trunnion contacts said at least one blocking flange of said hinge.

8. The resettable cutout sectionalizer of claim 7, wherein said hinge includes two inwardly extending flanges, and wherein the bridge portion of said trunnion contacts both of the two inwardly extending flanges.

9. The resettable cutout sectionalizer of claim 7, wherein said at least one bridge portion comprises a generally rectangular blocking bridge extending along the body portion of the trunnion.

10. The resettable cutout sectionalizer of claim 7, wherein said trunnion is cast as a unitary piece.

11. The resettable cutout sectionalizer of claim 7, wherein said trunnion comprises metal.

12. The resettable cutout sectionalizer of claim 7, comprising a connection pin for movably attaching the trunnion to the sectionalizer, wherein the trunnion rotates via the connection pin.

13. The resettable cutout sectionalizer of claim 12, wherein the sectionalizer includes a latching pin, and wherein said trunnion includes a forked flange for engaging a neck portion of the latching pin.

14. The resettable cutout sectionalizer of claim 13, wherein said latching pin is spring loaded and pushes outward upon actuation of said sectionalizer.

15. The resettable cutout sectionalizer of claim 14, wherein said latching pin is reset by pulling a body of said sectionalizer downward to allow said forked flange to fully engage said latching pin.

16. The resettable cutout sectionalizer of claim 15, wherein the reset latching pin allows the sectionalizer body to be rotated into the closed position in said cutout body.

17. The resettable cutout sectionalizer of claim 16, wherein said latching pin is reset without removing said sectionalizer from said cutout body.

* * * * *